(12) United States Patent
Simmons

(10) Patent No.: US 6,999,548 B2
(45) Date of Patent: Feb. 14, 2006

(54) COMMUNICATION CHANNEL DETECTOR AND CHANNEL DETECTION METHOD

(75) Inventor: Sean B. Simmons, Waterloo (CA)

(73) Assignee: Research In Motion Limited, Waterloo (CA)

(*) Notice: Subject to any disclaimer, the term of this patent is extended or adjusted under 35 U.S.C. 154(b) by 794 days.

(21) Appl. No.: 09/992,814

(22) Filed: Nov. 6, 2001

(65) Prior Publication Data
US 2002/0055334 A1    May 9, 2002

Related U.S. Application Data

(60) Provisional application No. 60/246,429, filed on Nov. 7, 2000.

(51) Int. Cl.
*H03D 3/24*   (2006.01)

(52) U.S. Cl. ............ 375/375; 375/344; 375/343; 375/336; 375/342; 375/346; 375/150; 375/259; 324/76.82; 329/300; 370/514

(58) Field of Classification Search .......... 375/375, 375/344, 343, 336, 342, 346, 150, 259; 324/76.82; 329/300; 370/514
See application file for complete search history.

(56) References Cited

U.S. PATENT DOCUMENTS

| | | | | |
|---|---|---|---|---|
| 5,117,441 A | * | 5/1992 | Weigand | 375/336 |
| 5,438,254 A | * | 8/1995 | Ho et al. | 324/76.82 |
| 5,473,612 A | * | 12/1995 | Dehner et al. | 370/514 |
| 5,514,998 A | * | 5/1996 | Kim | 329/300 |
| 5,856,997 A | * | 1/1999 | Mochizuki et al. | 375/150 |
| 6,118,825 A | * | 9/2000 | Ikeda et al. | 375/259 |
| 6,263,031 B1 | * | 7/2001 | Beidas et al. | 375/343 |
| 6,301,315 B1 | * | 10/2001 | Li | 375/346 |
| 6,674,817 B1 | * | 1/2004 | Dolle et al. | 375/342 |
| 6,771,718 B1 | * | 8/2004 | Huttunen | 375/344 |

* cited by examiner

*Primary Examiner*—Shuwang Liu
*Assistant Examiner*—Sudhanshu C. Pathak
(74) *Attorney, Agent, or Firm*—Jones Day; Krishna K. Pathiyal; Robert C. Liang (57) ABSTRACT

A communications channel detector which determines the availability of a desired type of communications channel in a communication system having at least one communications channel, the communications channels including data streams comprising a number of data symbols. The channel detector includes a phase detector, a phase comparator coupled to the phase detector, and a phase correlator coupled to the phase comparator. The phase detector is configured to provide a plurality of phase measurements for at least two consecutive data symbols comprising a selected one of the communications channels. The phase comparator is configured to determine the phase differences between the obtained phase measurements. The phase correlator is configured to determine the whether or not the determined phase differences exhibit a predetermined phase difference profile.

41 Claims, 8 Drawing Sheets

COMMUNICATION CHANNEL DETECTOR AND CHANNEL DETECTION METHOD

CROSS-REFERENCE TO RELATED APPLICATION

This application claims priority from U.S. Provisional Application Ser. No. 60/246,429, filed on Nov. 7, 2000, and titled "Communication Channel Detector and Channel Detection Method". The complete disclosure of this provisional application, including drawings and claims, is hereby incorporated into this application by reference.

FIELD OF THE INVENTION

The present invention relates to a communication channel detection system. In particular, the present invention relates to a method and a system for determining the availability of communication channels with a communication scheme allowing multiple communication channels.

BACKGROUND OF THE INVENTION

In mobile communication systems, a mobile communication unit, commonly referred to as a mobile device, must be capable of detecting channels which are available for communication with one or more base stations (BSs). For example, although a particular communications system may carry several different communications channels, all of the communications channels may not always be available to the mobile device or available in the geographical area in which the mobile device is situated. Consequently, if the mobile device is powered off and then on again, or moves from a service area of one of the BSs to the service area of another BS, the mobile device must execute a channel scanning routine to identify the communication channels available to the mobile device. Two channel scanning routines are commonly used to identify available communications channels.

According to one channel scanning routine, the mobile device measures the average signal power of all channels within the frequency band in which the mobile device is designed to operate, and then selects a communication channel whose measured power exceeds a predetermined threshold power rating. According to another channel scanning routine, the mobile device performs a power spectral measurement of all channels within the frequency band in which the mobile device is designed to operate, and then selects a communication channel in accordance with the spectral measurements. However, these techniques have a number of deficiencies.

Most significantly, the conventional channel scanning routines are prone to false positives, namely incorrectly identifying unavailable channels as possible available channels. Further channel qualification functions such as monitoring a channel for a synchronization pattern or signal are then normally performed for channels identified as possible available channels. These further qualification functions can be time intensive and as such, false positives cause a mobile device to waste computing and power resources performing such functions for unavailable channels.

Attempts have been made to address the time required to detect an available communications channel. In accordance with one such approach, instead of the mobile device always scanning each channel within the frequency band in which the mobile device is designed to operate, the mobile device maintains a list of the most recently-used communications channels, and initially scans only the most recently-used communication channels as identified on the list. If none of the most recently-used channels are available, the mobile device then scans the remaining communications channels. Although this latter approach can reduce the channel detection time, it is still prone to indicating false positives.

Therefore, there remains a need for a communications channel detector and channel detection method which reduces the number of false positives.

There remains a related need for a communications channel detector and channel detection method which determines the availability of a desired type of communications channel in a communication system.

SUMMARY OF THE INVENTION

According to one aspect of the present invention, there is provided a communications channel detector which determines the availability of a desired type of communications channel in a communication system having at least one communications channel, the communications channels including data streams comprising a plurality of data symbols. The channel detector includes a phase identifier, a phase comparator coupled to the phase identifier, and a phase correlator coupled to the phase comparator. The phase identifier is configured to provide a plurality 'n' of phase measurements for each of a plurality of consecutive ones of the data symbols comprising one of the communications channels, the n phase measurements for any one of the data symbols respectively corresponding to n timing offsets from a center of the data symbol. The phase comparator is configured to determine the differences between the phase measurements for consecutive data symbols, each of the differences corresponding to one of the n timing offsets and determined between phase measurements corresponding to the one of the n timing offsets, to provide a plurality of phase differences for each timing offset. The phase correlator is configured to determine whether or not the plurality of phase differences for at least one of the timing offsets exhibit a predetermined phase difference profile.

According to another aspect of the present invention, there is provided a method for determining the availability of a desired type of communications channel in a communication system having at least one communications channel, and in which the communications channels include data streams comprising a plurality of data symbols defining symbol periods. The method includes the steps of, for each of the at least one communications channel, (1) obtaining a plurality 'n' of phase measurements for each of a plurality of consecutive ones of the data symbols comprising the communications channel; (2) for each pair of consecutive data symbols of the plurality of consecutive data symbols, determining n phase differences between ones of the obtained phase measurements separated in time by a symbol period, to provide n sets of phase differences between phase measurements for consecutive symbols; and (3) determining whether or not at least one of the n sets of phase differences exhibits a predetermined phase difference profile.

In a further embodiment of the invention, a communications channel detector for determining the availability of a desired type of communications channel in a communication system having at least one communications channel, the communications channels including data streams comprising a plurality of data symbols, comprises phase identifier means, phase comparator means coupled to the phase identifier means, and phase correlator means coupled to the phase comparator means. The phase identifier means provides a plurality 'n' of phase measurements for each of a plurality of consecutive ones of the data symbols comprising a selected one of the communications channels, the n phase measurements for any one of the data symbols respectively corresponding to n timing offsets from a center of the data symbol. The phase comparator means determines the differences between the phase measurements for consecutive data symbols, each of the differences corresponding to one of the n timing offsets and determined between phase measurements corresponding to the one of the n timing offsets, to provide a plurality of phase differences for each timing offset. The phase correlator means determines whether or not the plurality of phase differences for at least one of the timing offsets exhibit a predetermined phase difference profile from a correlation of the plurality of phase differences with the predetermined phase difference profile.

According to a further aspect of the invention, a wireless communication device comprises a transceiver configured to transmit and receive signals over a desired type of communications channel and a digital signal processor (DSP) operatively connected to the transceiver. The DSP comprises computer software code for determining the availability of the desired type of communications channel in a communication system having at least one communications channel, the communications channels including data streams comprising a plurality of data symbols, by performing the functions of, for each of the at least one communications channels, (1) obtaining a plurality 'n' of phase measurements for each of a plurality of consecutive ones of the data symbols comprising the communications channel; (2) for each pair of consecutive data symbols of the plurality of consecutive data symbols, determining n phase differences between ones of the obtained phase measurements separated in time by a symbol period, to provide n sets of phase differences between phase measurements for consecutive symbols; and (3) determining whether or not at lease one of the n sets of phase differences exhibits a predetermined phase difference profile.

According to a still further aspect of the invention, a computer-readable medium carries processing instructions for configuring a computational device with a method for determining the availability of a desired type of communications channel in a communication system having at least one communications channel, the communications channels including data streams comprising a plurality of data symbols. The method comprises the steps of, for each of the at least one communications channel, (1) obtaining a plurality 'n' of phase measurements for each of a plurality of consecutive ones of the data symbols comprising the communications channel; (2) for each pair of consecutive data symbols of the plurality of consecutive data symbols, determining n phase differences between ones of the obtained phase measurements separated in time by a symbol period, to provide n sets of phase differences between phase measurements for consecutive symbols; and (3) determining whether or not at lease one of the n sets of phase differences exhibits a predetermined phase difference profile.

BRIEF DESCRIPTION OF THE DRAWINGS

In order that the invention may be more clearly understood, preferred embodiments thereof will now be described in detail by way of example, with reference to the accompanying drawings, in which.

DETAILED DESCRIPTION OF THE PREFERRED EMBODIMENT

Figure 1:
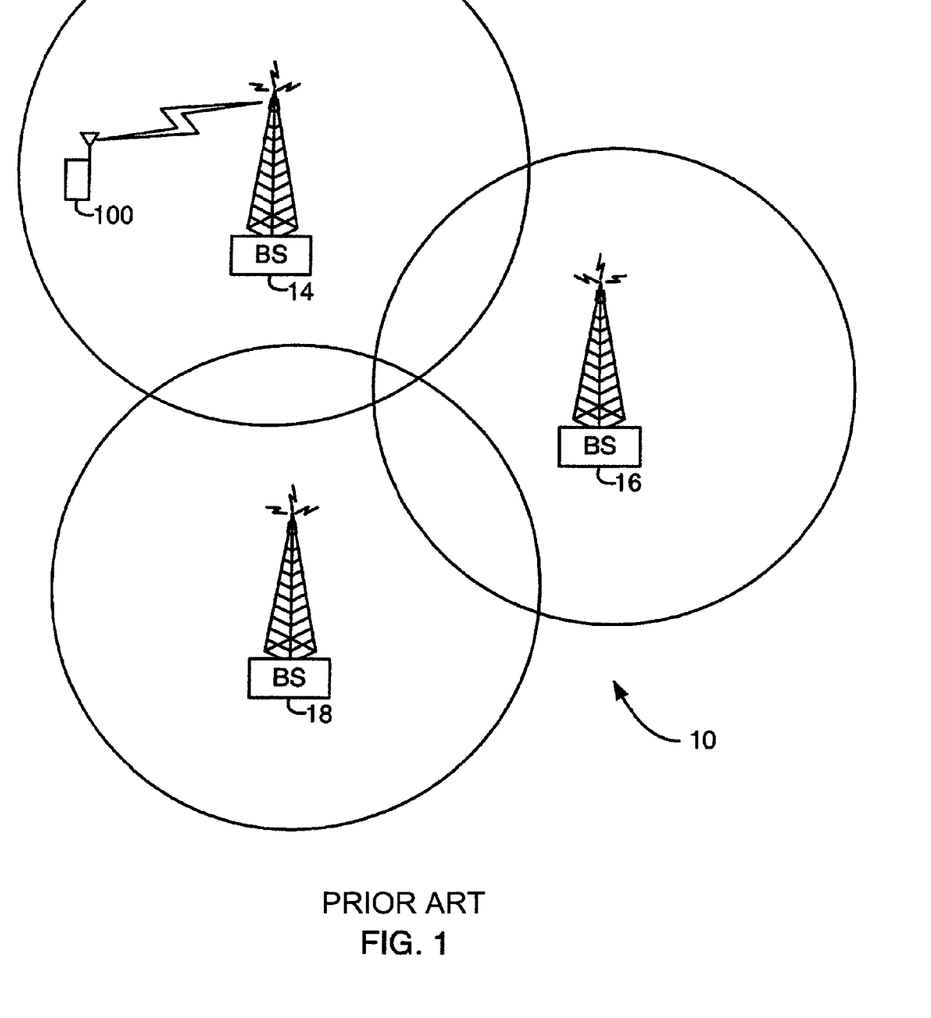
FIG. 1 is a schematic view of a mobile communication system in which the channel detector according to the present invention may be employed.

Turning to FIG. 1, a communication system, denoted generally as 10, is shown comprising a mobile device 100, and a number of base stations (BSs) 14, 16, 18. Typically, the mobile communication system 10 includes a number of mobile devices 100, however for increased clarity of discussion FIG. 1 only depicts a single mobile device 100.

The communication system 10 includes a number of communications channels (not shown) over which the mobile device 100 can communicate with the BSs 14, 16, 18. Preferably, the communications channels comprise wireless communications channels, and the BSs comprises wireless communication stations which facilitate communication between the mobile device 100 and remote communications devices. However, it should be understood that the communications channels may also comprise land-based communications channels, and the BSs comprise land-based communication stations in a WAN configuration.

Each communications channel carries a data stream comprising a plurality of data symbols. Many mobile communication systems, such as the Mobitex™ system in North America and the GSM 900 and GSM 1800 systems in Europe, use the Gaussian Minimum Shift Keying (GMSK) modulation scheme. Accordingly, preferably at least one of the communications channels implemented in the communication system 10 comprises a wireless GMSK communications channel carrying a data stream of GMSK data symbols, at least one of the remaining communications channels comprises a non-GMSK wireless communications channel carrying a data stream of non-GMSK data symbols, and the mobile device 100 is configured to identify the GMSK communications channels which are available to the mobile device 100 for communication with the BSs 14, 16, 18.

Preferably, the mobile device 100 is implemented as a handheld mobile wireless communications device, such as a mobile telephone, a wireless modem, a wireless pager, or a wireless-enabled personal digital assistant (PDA). However, it should be appreciated that the mobile device 100 may also be implemented as a desktop wireless communications device, or may even be implemented as a land-based network communications device for communication over a land-based WAN.

Figure 2:
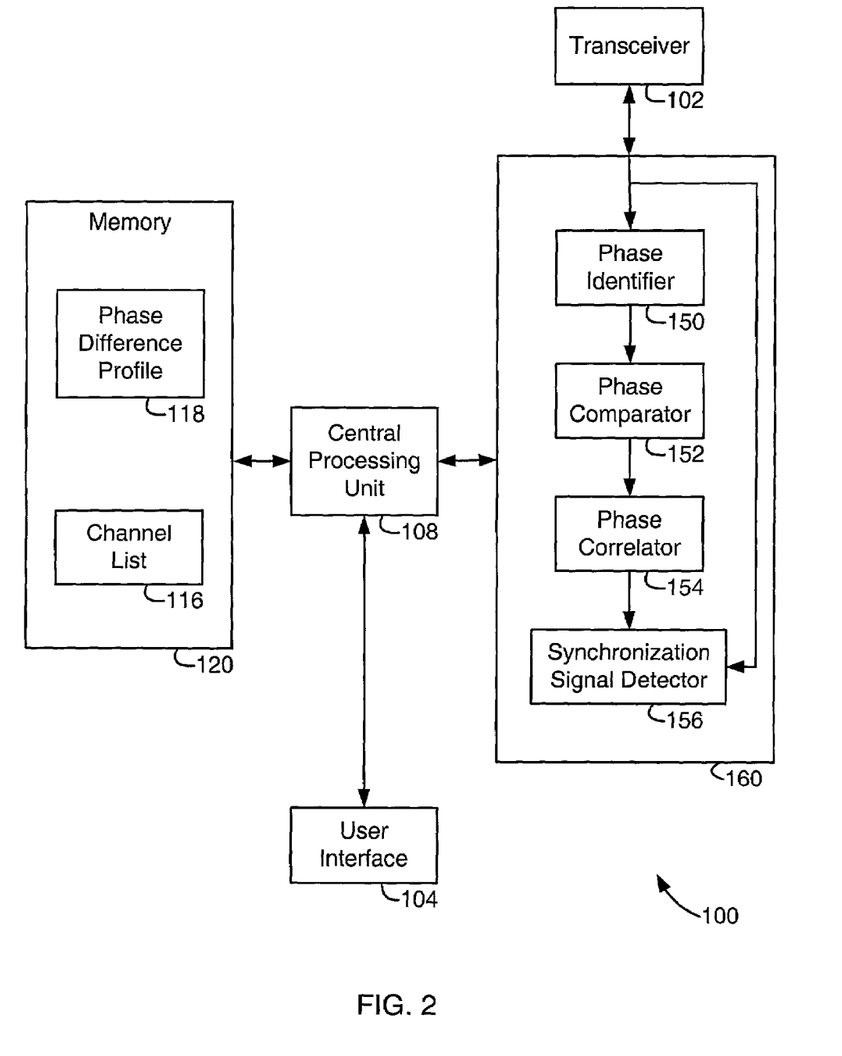
FIG. 2 is a schematic view of the channel detector shown in FIG. 1.

As shown in FIG. 2, the mobile device 100 comprises a transceiver 102, a memory 120, a user interface 104, a central processing unit 108, and a signal processing unit 160. The central processing unit 108 is in communication with the memory 120, the user interface 104 and the signal processing unit 160, and the signal processing unit 160 also communicates with the transceiver 102. The transceiver 102 is fitted with an antenna (not shown) configured for wireless communication over the frequency range spanned by the communications channels of the communication system 10. The user interface 104 varies with the configuration of the mobile device 100, and may include such components as a data presentation device, such as a LCD or CRT display, a speaker, and/or a data entry device, such as a microphone, a keyboard, a keypad or writing tablet. In the example device 100 of FIG. 2, only the components associated with channel detection in accordance with the instant invention are shown in the signal processing unit 160. It will be apparent to those skilled in the art that the signal processing unit 160 may also include further components for processing received communication signals and communication signals to be transmitted from the transceiver 102.

The memory 120 may comprise a non-volatile memory such as a Read Only Memory (ROM), a volatile memory such as a Random Access Memory (RAM), and possibly both types of memory. Preferably, a non-volatile memory would be implemented as an electronic memory, but may however instead be implemented as a magnetic or optical memory if desired. In the example device 100, the memory 120 is preferably a non-volatile memory in which a channel list 116 and a phase difference profile 118 are stored. The device 100 may also include a further memory (not shown), such as a volatile memory component for storing phase samples used for channel detection as described in further detail below.

The channel list 116 identifies all communication channels residing within the frequency band in which the mobile device 100 is designed to operate. Preferably, the channel list 116 specifies the channel frequency of each channel, and the symbol period of the data symbols carried on each communications channel. Since the channel list 116 does not normally change and should not be lost if a device power supply (not shown) is depleted, it is preferably stored in the non-volatile memory 120 as shown in FIG. 2.

Figure 3:
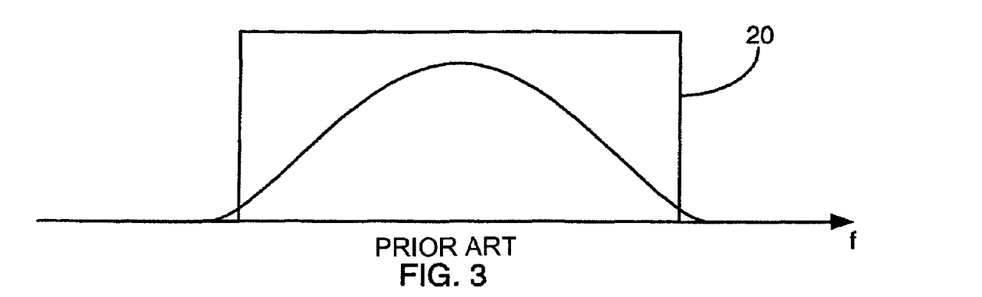
FIG. 3 is a histogram depicting a phase difference distribution for a GMSK signal and a known window function used for detecting GMSK signals.

The phase difference profile 118 is used to determine whether a selected communications channel is available. As is well known, the phase difference between data symbols in a GMSK symbol stream is not constant. Rather, the GMSK symbols are subject to inter-symbol interference (ISI) such that the phase difference between symbols is dependent upon the phase of preceding and following symbols. Consequently, if GMSK symbols are sampled twice per symbol and at symbol centers, and the phase difference between consecutive samples is determined, as is done in one conventional channel detection system, a histogram having the general characteristic shape shown in FIG. 3 would be produced.

The histogram of the phase difference characteristic of a communications channel has been used to detect the availability of communications channels in some known communication systems. Channel histograms are processed through a windowing function, such as the window 20 shown in FIG. 3, to generate a metric for the channel under consideration to determine whether or not the channel exhibits the characteristic phase difference distribution. A high metric indicates a high degree of similarity between the generated histogram and the desired characteristic distribution, whereas a low metric indicates a lower degree of similarity. To ensure that GMSK channels are reliably detected, the window function must encompass a relatively wide portion of a generated histogram. However, such a wide window increases the probability of false positives.

Figure 4:
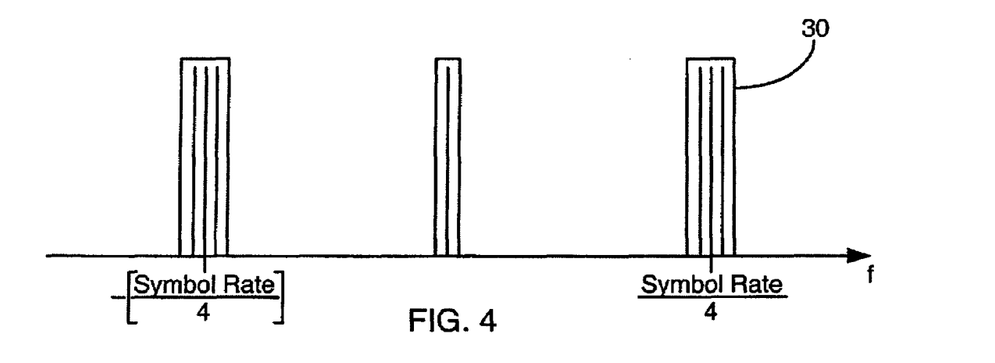
FIG. 4 is a histogram depicting the phase difference distribution for a GMSK symbol stream sampled in accordance with the present invention.

The inventors of the present invention discovered that instead of sampling each GMSK symbol and then determining the phase difference between consecutive samples, if phase measurements of consecutive symbols are taken at a certain particular offset from symbol centers and the differences between phase measurements which are spaced apart in time by the data symbol period are determined, then the peaks in the histogram tend to be grouped as shown generally in FIG. 4. A different window function 30 can then be used to exploit this newly discovered characteristic distribution in order to better distinguish possible GMSK channels from non-GMSK channels. More reliable determination of a scanned channel as either a possible GMSK channel or a non-GMSK channel advantageously avoids the time and power intensive further channel qualification operations for many non-GMSK channels.

Accordingly, instead of the phase difference profile 118 comprising a histogram of the expected differences between consecutive phase measurements, the phase difference profile 118 comprises a predetermined histogram of the expected differences between pairs of phase measurements taken from a GMSK channel, with each phase measurement of a pair being taken at instants spaced apart in time by the data symbol period. Consequently, a first phase measurement of a phase measurement pair is taken from a first data symbol of a pair of consecutive data symbols, and a second phase measurement of the phase measurement pair is taken from a second data symbol of the data symbol pair.

Preferably, the predetermined histogram is established using the phase differences which would be expected if the measurements were taken at the particular offset, relative to the symbol centers, which would generate a pattern as shown in FIG. 4.

Returning now to FIG. 2, it can be seen that the signal processing unit 160 includes a phase identifier 150, a phase comparator 152, a phase correlator 154 and a synchronization (sync) signal detector 156, in addition to further signal processing components normally associated with receiving and transmitting communication signals (not shown). These elements 150, 152, 154 and 156 could be implemented for example in hardware, as computer software in a Digital Signal Processor (DSP) or as processing instructions for the CPU 108. Such processing instructions would establish in a memory accessible to the CPU 108 a memory object or module defining the phase identifier 150, a memory object or module defining the phase comparator 152, a memory object or module defining the phase correlator 154, and a memory object or module defining the sync signal detector 156.

The phase identifier 150 is in communication with the transceiver 102 and can access the channel list 116 in memory 120. The phase identifier 150 is configured to select each of the channels identified in the channel list 116, one at a time, and to measure or determine (at instants spaced apart in time by the symbol period) the phase of each data symbol received by the transceiver 102 on the selected communications channel.

As discussed above, if phase measurements of consecutive symbols are taken at a particular offset from symbol centers and the differences between phase measurements which are spaced apart in time by the data symbol period are determined, then the peaks in the histogram tend to be grouped. The availability of each communications channel can then be determined by comparing the histogram so determined with the phase difference histogram of the phase difference profile 118.

One problem in implementing such a scheme is that the correlation between the histogram of measured phase differences and the phase difference histogram of the phase difference profile 118 is sensitive to the timing offset, relative to the center of each data symbol, at which the phase measurements are taken. As described above, the histogram pattern shown in FIG. 4 is generated when the phase of a signal is sampled at a particular offset from symbol centers. However, in many wireless communication systems, such as Mobitex, accurate determination of signal timing and maintenance of exact sampling instants corresponding to the particular offset is difficult without reference to a frame synchronization signal. In addition, signal timing determination typically either requires or provides information regarding the type of communication signal.

The inventors of the present invention discovered that this problem could be overcome by effectively oversampling and thereby generating multiple histograms for each channel. Accordingly, the phase identifier 150 is configured to n-times oversample the phase of each data symbol received by the transceiver 102 on the selected communications channel, to thereby obtain n phase measurements per symbol. This oversampling could be accomplished by actually measuring the phase of a received signal n times per symbol or symbol period. Alternatively, the n phase measurements could also include calculated or estimated phase values. For example, the phase of a received signal could be measured or sampled at a particular sampling rate that generates 2 phase measurements per symbol period. The remaining n−2 phase values per symbol could then be interpolated and/or extrapolated using measured phase values and interpolation or extrapolation algorithms. These algorithms may possibly be linear or non-linear. In general, if 'm' of the phase measurements per symbol are actually measured, then the remaining n-m phase measurements may be estimated.

Figure 5:
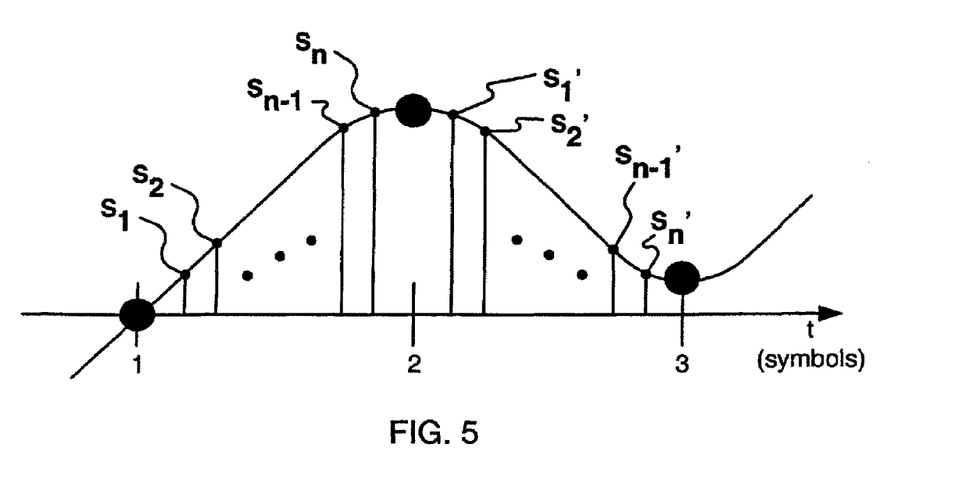
FIG. 5 is a phase trellis for a GMSK symbol stream, illustrating the sampling method implemented by the channel detector.

The phase identifier 150 is preferably configured to obtain a number ("n") of phase measurements, which may include actual measurements and estimated phase values as described above, from the first data symbol of a consecutive pair of data symbols, and to obtain a number ("n") of phase measurements from the second data symbol of the data symbol pair. Consequently, as shown in FIG. 5, each phase measurement $S_1, S_2, \ldots S_n$ obtained from the first data symbol of the symbol pair is associated with one of the phase measurements $S_1', S_2' \ldots S_n$ obtained from the second data symbol of the symbol pair, and is spaced apart in time from the associated second phase measurement $S_n', S_2' \ldots S_n$ by the symbol period. Each of the phase measurements $S_1, S_2, \ldots S_n$ corresponds to a different offset from the symbol centers (designated 1, 2, and 3 in FIG. 5). At least one of the sampling instants at which a phase measurement is made or estimated will be at or sufficiently close to the particular offset from the symbol centers to generate the phase difference histogram similar to the histogram of the phase difference profile 118 if the selected channel is a GMSK channel. Advantageously, this oversampling and multiple histogram generation thus ensures that a phase difference histogram similar to that shown in FIG. 4 will be generated for a GMSK channel, without first accurately determining signal timing and maintaining exact sampling instants corresponding to the particular offset for each channel.

As shown in FIG. 2, the phase comparator 152 is in communication with the phase identifier 150, and is configured to determine the difference between each pair of associated phase measurements, and to form, in a RAM (not shown) for example, a histogram of the phase differences for the phase measurement pairs having the same offset from the symbol centers. As discussed above, preferably the phase identifier 150 is configured to obtain a number ("n") pairs of phase measurements at instants spaced apart in time by the symbol period. Accordingly, preferably the phase comparator 152 is configured to form a number ("n") of histograms of phase differences, such that each histogram is uniquely associated with a sampling instant and offset for the selected communications channel and identifies the distribution of the differences between the measured phases of the associated phase measurement pairs. Referring again to FIG. 5, the phase measurements $S_1$ and $S_1'$ are made at the same offset from the centers of symbols 1 and 2. Therefore, the difference between these phase measurements is calculated and used to form a phase difference histogram for samples taken at this offset from symbol centers. The difference between the phase measurement $S_1'$ and a measurement made at this offset in the following symbol period (not shown) would also be calculated and included in the histogram for this offset. Phase differences for subsequent symbol periods for this offset, as well as those corresponding to each of the n−1 other offsets, are similarly calculated and used to form the n phase difference histograms.

The phase correlator 154 can access the memory 120 and thus the phase difference profile 118, either directly or via a command executed in the CPU 108, and is in communication with the phase comparator 152. Each phase difference histogram of measured phase differences is correlated with the phase difference histogram of the phase difference profile 118 by the phase correlator 118. If the channel being scanned is a GMSK channel, then at least one of the timing offsets (for example the $k^{th}$ timing offset) will be sufficiently similar to the timing offset used to generate the phase difference profile 118 that the calculated phase difference distribution for the $k^{th}$ histogram will exhibit a profile approaching the expected distribution of the phase difference profile 118.

Figure 6A:
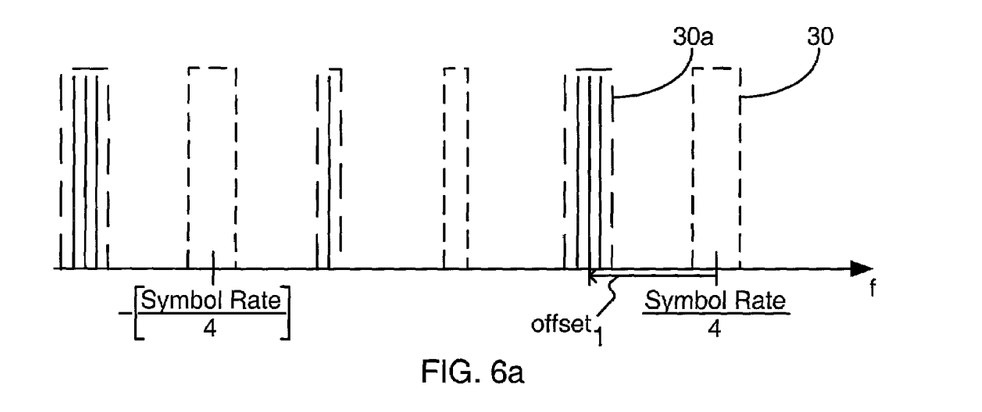
FIGS. 6a and 6b are histograms which illustrate the effect of frequency offset in a receiver.
Figure 6B:
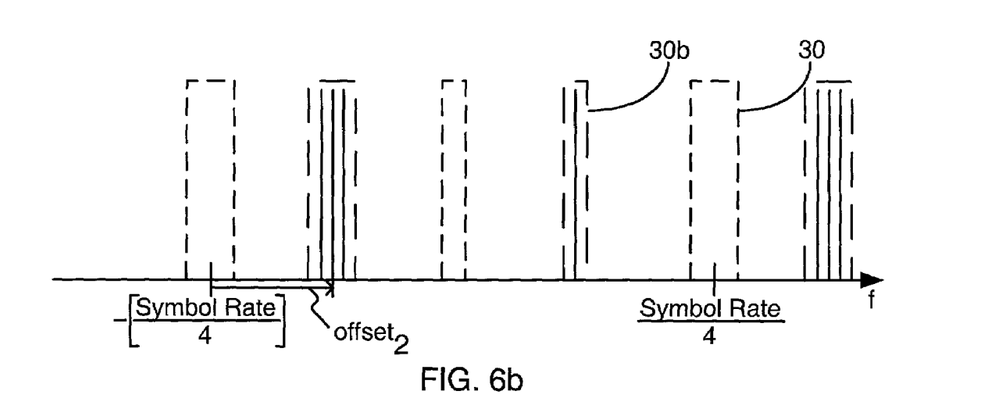

Communication channels can be affected by a frequency offset between an oscillator at one of the BSs 14, 16, 18 and a local oscillator in the mobile device 100. The mobile device 100 can accurately determine the frequency offset between its local oscillator and the BS only when the mobile device 100 receives a frame synchronization signal. At any other time, the frequency offset is not accurately known. Therefore, the calculated phase difference histogram can appear shifted, as shown in FIGS. 6a and 6b. For channels affected by frequency offset, FIGS. 6a and 6b clearly illustrate that the static window function 30 will not pick up shifted versions of the desired phase difference distribution, which could likely correspond to legitimate GMSK channels. A channel detector with a static window function is therefore best suited to channels not affected by frequency offset.

In a further embodiment of the invention, the phase correlator 154 is configured to correlate each phase difference histogram with the phase difference profile 118, using a sliding window function to process each calculated phase difference histogram to calculate a metric, which is a measure of the similarity between each histogram of measured phase differences and the expected histogram.

The windowing function may effectively be the expected histogram, for example. The metric for each histogram could then be calculated by computing the inner product of the window function and computed histogram, then dividing this quantity by the number of phase differences used to compute the histogram. The result is a single number between 0 and 1, with numbers closer to 1 indicating a closer match to the expected histogram. The phase correlator computes this value for various frequency offsets of the window function to thereby provide the sliding window function. The maximum of the computed values is determined and used as the metric for the computed histogram.

Instances of the sliding window function are denoted with reference designation 30$a$ in FIG. 6$a$ and with reference designation 30$b$ in FIG. 6$b$. The effect of moving the window 30 within a range of frequencies is that shifted versions of the calculated distribution will correlate properly with the expected histogram of the phase difference profile 118. By using such a correlation function and sliding window, the window area can be kept relatively small, which will reduce false positives. The sliding window also improves the sensitivity of the phase correlator 154 by providing for detection of the desired distribution even for channels affected by frequency offset.

The synchronization signal detector 156 is in communication with the transceiver 102 and the phase correlator 154. If one of the histograms of measured phase differences exhibits a similar phase difference distribution to that of the expected histogram, or has an associated metric above a predetermined threshold, then the synchronization signal detector 156 is configured to further analyse the data stream received over the selected communications channel, for example by detecting a frame synchronization signal, and to thereby determine if the modulation of signals carried thereon is of the expected modulation scheme. If the synchronization signal detector 156 determines that the selected communications channel is of the expected modulation scheme, the signal processor 106 selects the communications channel for communication with the BSs 14, 16, 18. It should be apparent that once a channel is selected for further analysis on the basis its corresponding metric, then other analysis schemes or methods may be executed in order to make a final determination of whether or not the channel is of the desired type. Although a sync signal detector 156 is shown in FIG. 2, other types of further channel qualification systems and operations will also be apparent to those skilled in the art and as such are considered to be within the scope of the invention.

Figure 7:
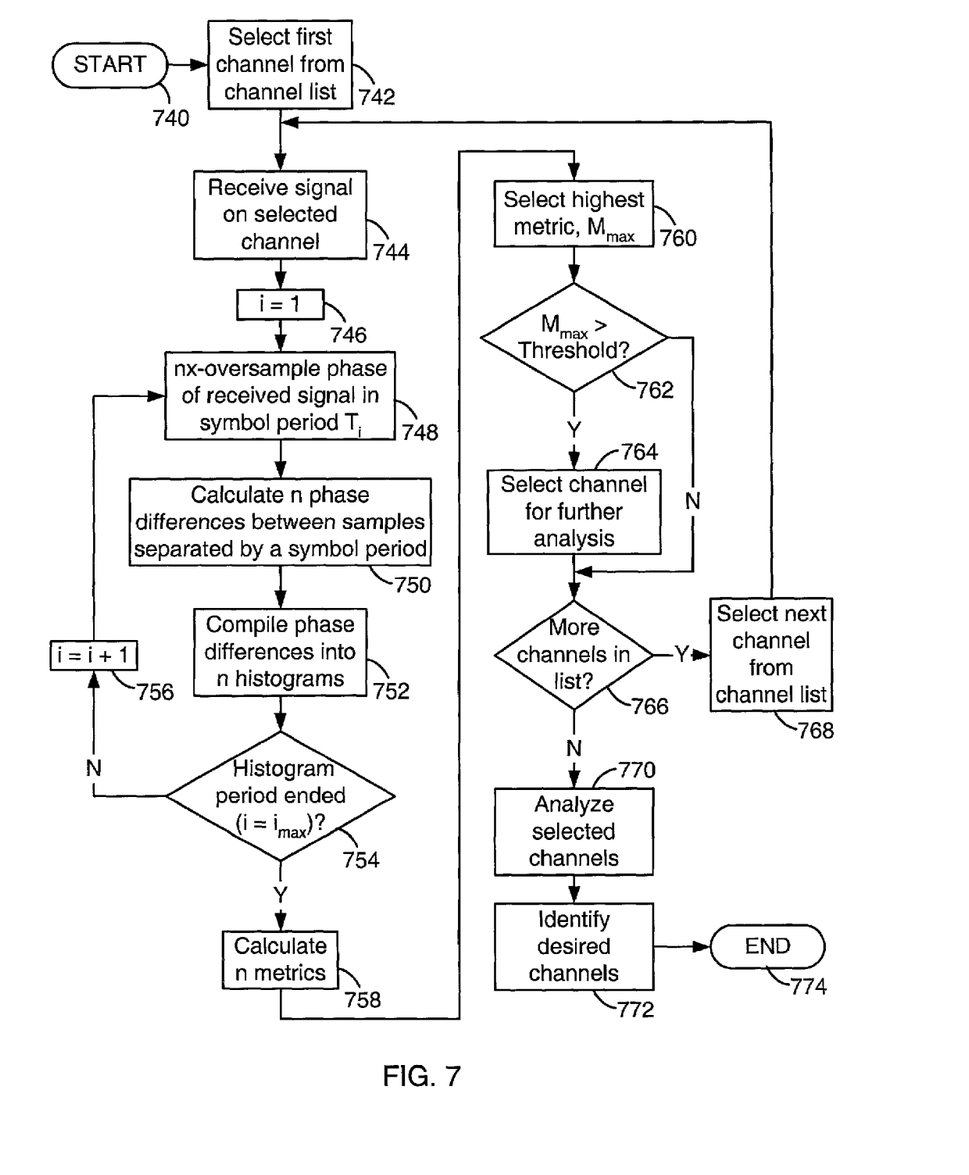
FIG. 7 is a flow chart illustrating a channel detection method implemented by the channel detector.

A channel detection method according to an aspect of the invention will now be described in detail with reference to the flow chart of FIG. 7. The channel detection method begins at step 740. A first channel is selected from the channel list stored on the communication device at a step 742. The channel list from which channels are selected may possibly be a complete list of all channels on which the device is configured for communication, but is preferably a list of the most recently used communication channels.

The mobile device 100 then receives a signal on the selected channel, as indicated at step 744. A symbol period counter variable i is initialized at step 746 and the phase of the received signal in symbol period $T_i$ is n-times oversampled at step 748. As described above, this oversampling may be accomplished by oversampling a received signal or by both sampling and estimating signal phase. Phase differences between samples spaced apart by a full sample period are calculated as described above in step 750. The calculated phase differences are then compiled into n histograms at step 752.

Preferably, the number ("n") is between 8 and 16. For n>16, the sample spacing is so small that the phase comparator 152 typically generates more than one histogram having the desired characteristic distribution. Generation of more than one such histogram does not appreciably improve performance of the channel detection scheme, such that for greater than 16-times oversampling, the detection of GMSK channels is not significantly improved. On the other hand, for n<8, the sample spacing is typically too large to ensure that the timing offset required to generate the desired phase difference distribution is actually used.

Since the channel detection method may require multiple symbol periods to generate the n histograms, the steps 748, 750 and 752 are repeated a predetermined number of times. In the flow chart of FIG. 7, this is represented by the decision step 754. If a predetermined number of symbol periods, $i_{max}$, for generating the n histograms have not been sampled, then the symbol period counter variable i is incremented (756) and steps 748, 750 and 752 are repeated.

When $i_{max}$ symbol periods have been sampled and the corresponding phase differences have been compiled into the n histograms, the metrics indicating the degree of similarity between each of the n histograms and the phase difference profile 118 are calculated at step 758. The highest of these metrics, $M_{max}$, is then selected at step 760 for comparison with a threshold metric value at step 762. If the highest metric for the selected channel is greater than the threshold value, then the channel is selected for further analysis or "listening" at step 764. If not, then the channel is not selected for such further analysis. Whether or not the channel is selected for this further analysis, it is determined at step 766 if there are any more channels in the channel list. If there are more channels in the list, then the next channel in the list is selected at step 768 and steps 744 through 766 are repeated. Otherwise, the detection process continues at step 770.

The channel "listening" or further analysis is performed in step 770 on the channels selected for further analysis at step 764. Channels having the desired modulation scheme, 8k symbols/second (kS/s) GMSK for example, can then be identified at step 772, and the channel detection method ends at step 774.

Figure 8:
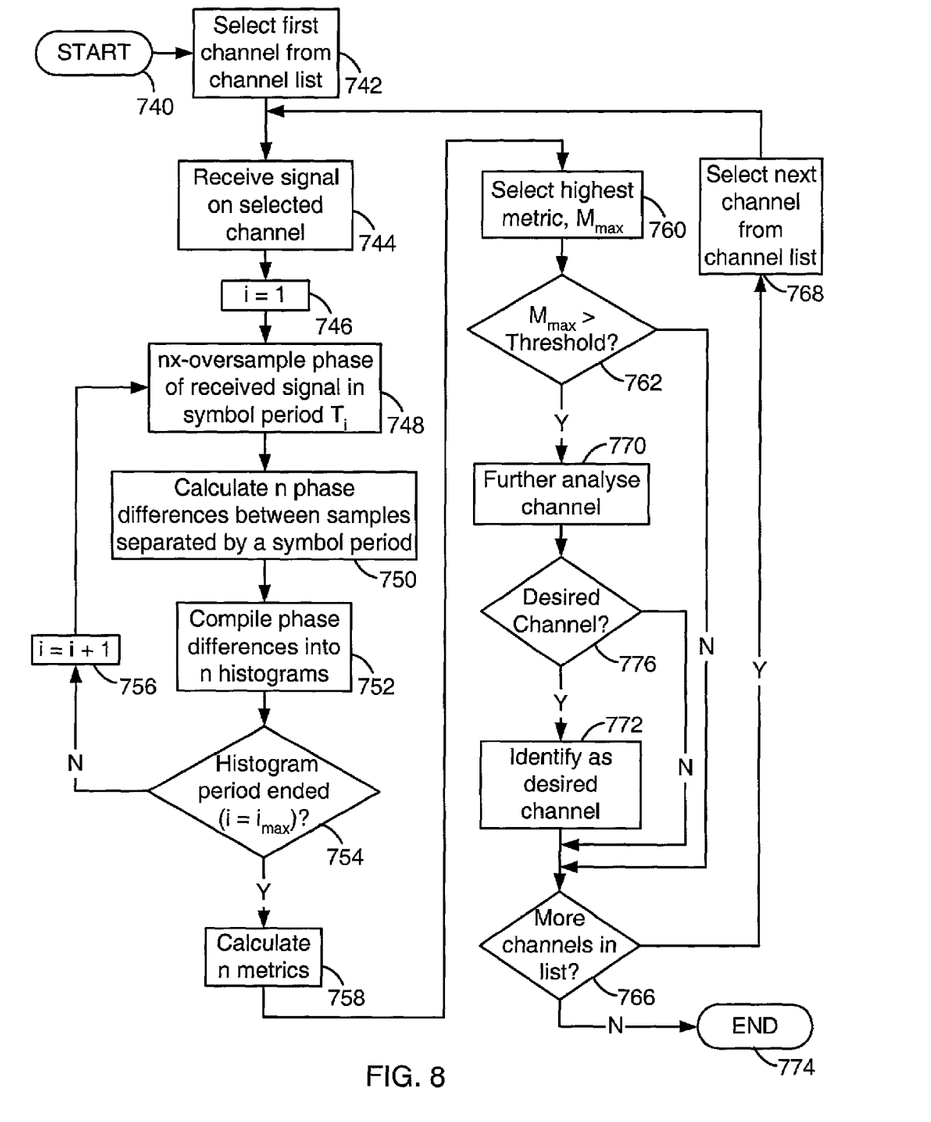
FIG. 8 is a flow chart illustrating a variation of the channel detection method shown in FIG. 7.

One variation of the channel detection method will now be described with reference to the flow chart of FIG. 8. The flow chart in FIG. 8 is substantially the same as that in FIG. 7, but involves somewhat different processing when a maximum metric is above the threshold value. Instead of performing the further channel analysis functions after all possible desired channels have been selected in step 764 as in FIG. 7, in the method of FIG. 8 the further channel analysis in step 770 is performed each time a channel is determined at step 762 to have a highest associated metric which is greater than the threshold. At step 776, the method determines whether or not the channel is a desired channel. If so, then the channel is identified as a desired channel at step 772; if not, the method proceeds to step 766 to determine whether or not there are any more channels in the channel list. When signals have been received on all channels in the channel list and have been analysed in accordance with the method, the method ends at step 774.

Figure 9:
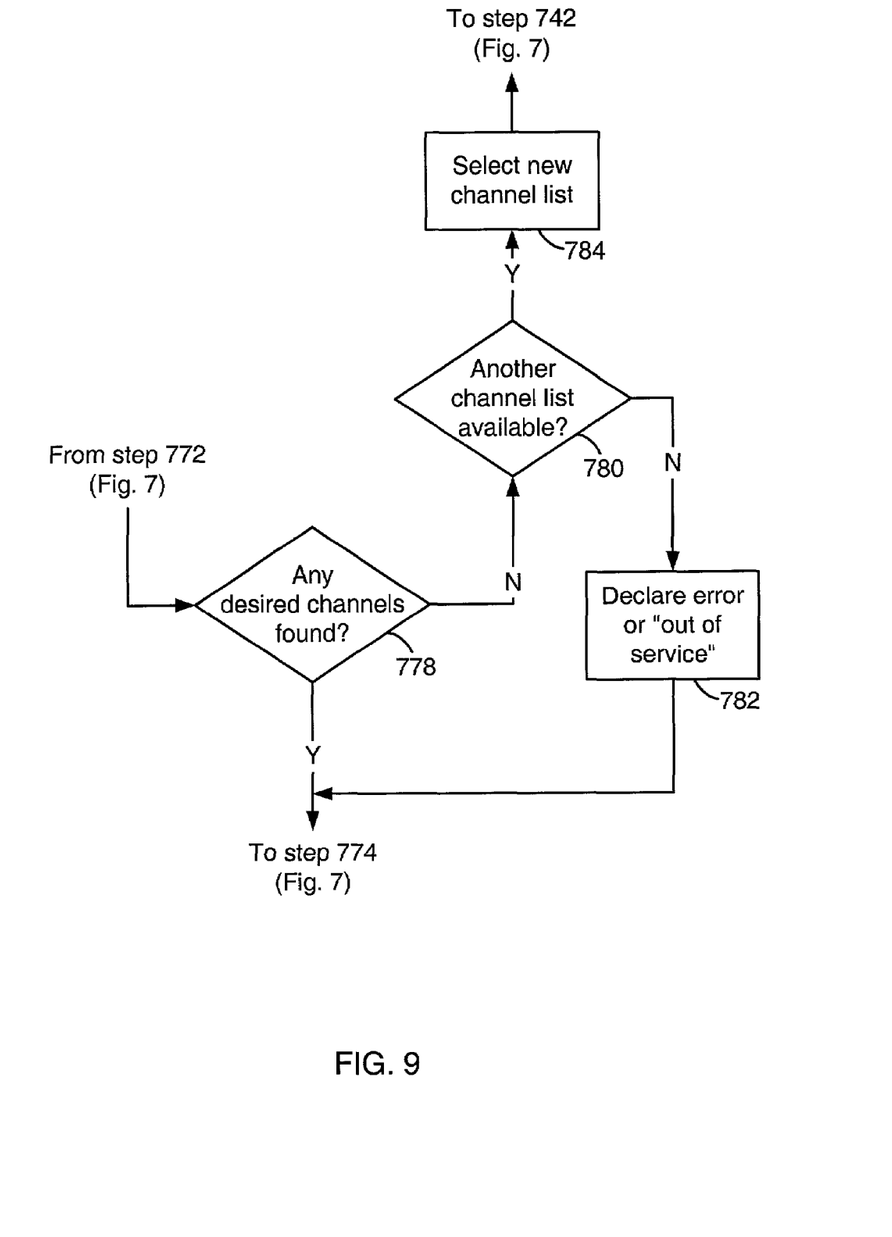
FIG. 9 is a flow chart illustrating another variation of the channel detection method.

Another variation of the channel detection method will now be described with reference to the flow chart of FIG. 9. The method steps 778 through 784 represented by the flow diagram in FIG. 9 are intended to be performed after step 772 in FIG. 7, before the channel detection method ends at step 774. In order to avoid congestion in FIG. 9 however, only the additional steps have been shown. The entire channel detection method will be apparent from reference to FIG. 7. As discussed above, the channel list used at step 742 is preferably a list of the most recently used channels. If the communication device finds that none of the channels in the channel list are of the desired type, then the method reverts to the complete channel list or another channel list to continue to check all channels on which the device may operate to determine whether or not any of such channels are of the desired type.

At step 778, if at least one channel of the desired type is found in the channel list used, then the method terminates at step 774 as discussed above. Otherwise, the method determines whether or not a different channel list is available (step 780). If not, then a step 782 of generating an error message or other notification indicating that no communication channels are available is performed before the method terminates at step 774. When another channel list is available on the device, a new channel list is selected (784) and the method is repeated. Although the method shown in FIG. 9 is based on the flow chart in FIG. 7, the method of FIG. 9 may be used in conjunction with the method of FIG. 8. The additional steps 778 through 784 would be executed after a negative determination in step 766 in FIG. 8, before the termination of the method at step 774.

As discussed above, preferably the phase correlator 154 uses a sliding window function to calculate a metric which determines the similarity of each calculated phase difference histogram to the predetermined phase difference profile 118. The sliding window function is incorporated into step 758 in the flow diagrams of FIGS. 7 and 8. Any channel for which the highest associated metric is above a predetermined threshold is selected for further analysis, whereas channels with metrics below the threshold are assumed to be non-GMSK channels.

Figure 10:
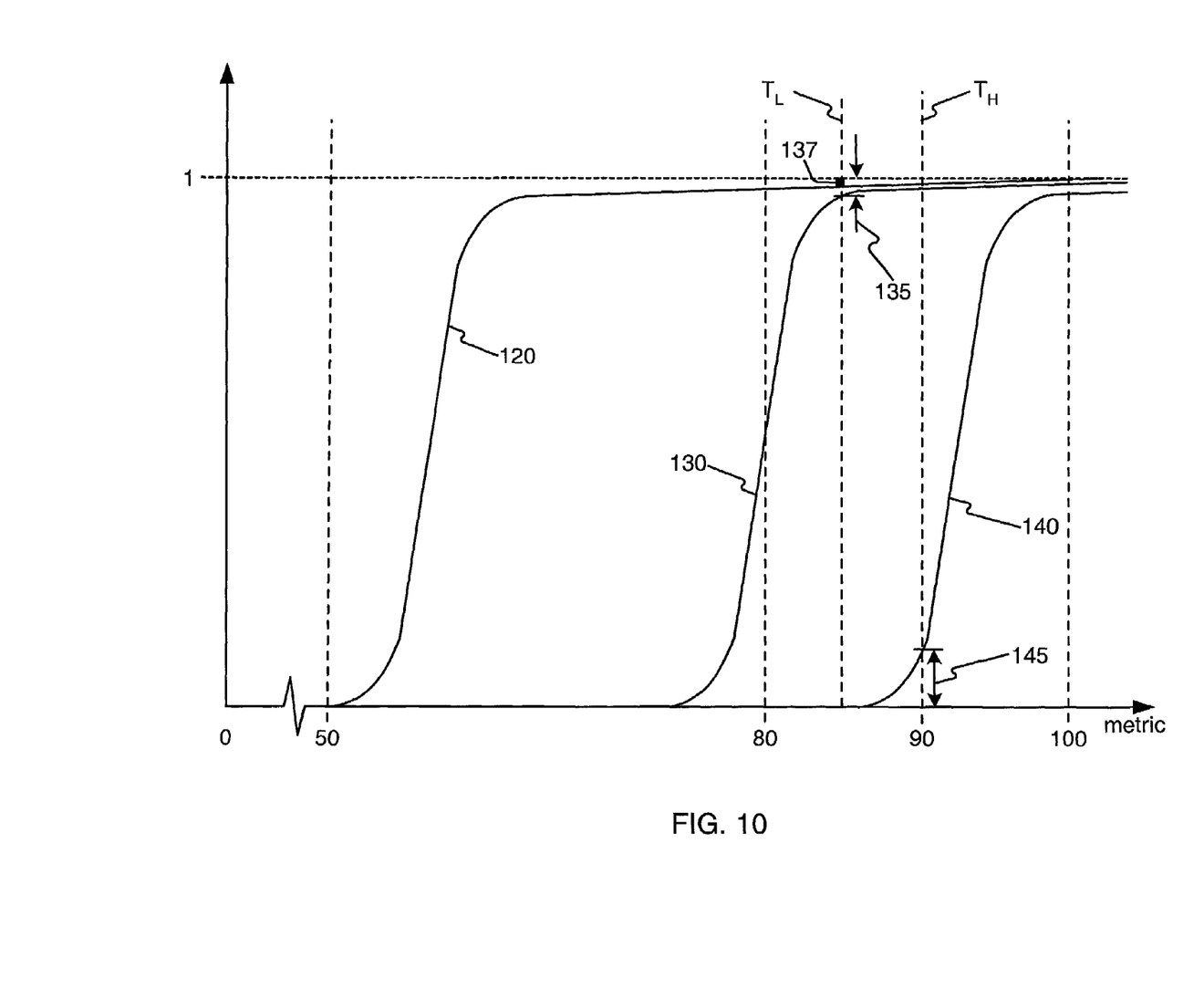
FIG. 10 is a graph illustrating cumulative distribution functions which may be used by the channel detector to detect available communications channels.

FIG. 10 shows cumulative distribution functions (CDFs) for metrics calculated for three different possible channels based on an expected histogram. As those skilled in the art will appreciate, the vertical axis in FIG. 10 represents a portion or percentage of a population of calculated metrics. If curve 120 represents the CDF for a channel carrying random noise for example, then nearly all such channels might have metrics in a relatively low range of 50 to 80. For illustrative purposes, curves 130 and 140, representative of channels carrying other types of signals, such as a 9.6 kS/s GMSK channel and an 8 kS/s GMSK channel for example, are also shown in FIG. 10. In the example of FIG. 10, the phase difference profile and expected histogram are associated with signals of the type corresponding to curve 140, as those signals generate the highest metrics. The exact metric values and shapes of CDFs for different signals will depend on the particular metric calculation implemented, and may be different than shown in FIG. 10. If the metric calculation method described above is used, then all metric values would be between 0 and 1. The metric values and CDFs shown in FIG. 10 and described below are purely illustrative examples only.

As shown in FIG. 10, channels of the type represented by curve 140 could be detected by selecting an appropriate metric value threshold. The selection of a particular threshold trades off channel sensitivity against accuracy. A higher threshold $T_H$ will detect fewer of the desired channels, the undetected desired channels (false negatives) being indicated at 145, but will also result in the selection of fewer non-desired channels (false positives) for further analysis. If a lower threshold such as $T_L$ is selected, then more of the desired channels will be selected for further analysis, but more non-desired channels, indicated at 135 and 137 in FIG. 10, will also be selected. A threshold metric value might be chosen to achieve a particular expected false positive/false negative rate for instance.

As will be apparent from FIG. 10, a mobile device can be optimized to distinguish between very similar channels by selection of a threshold metric value. In contrast to prior art channel detection schemes, the sampling and metric calculation scheme implemented by the mobile device 100 eliminates more non-GMSK channels before a channel listening process or other channel qualification operation is executed. Although the time required for such a further qualification process for a particular selected channel is not reduced, the number of non-desired channels for which the listening process is executed is reduced. Consequently, the mobile device 100 is able to realize significant time and power savings in detecting an available communications channel.

If detection of a different type of channel than that represented by curve 140 is desired, then a different phase difference profile would be chosen, resulting in different CDFs. A new threshold could then be selected, to give the same or a different expected false positive/false negative rate. Even though an expected false positive/false negative rate may be desired for detection of channels carrying different types of signals, the threshold values used in the detection process may be different.

The present invention is defined by the claims appended hereto, with the foregoing description being illustrative of several embodiments of the invention. Those of ordinary skill may envisage certain additions, deletions and/or modifications to the described embodiments which, although not explicitly described or suggested herein, do not depart from the scope of the invention, as defined by the appended claims.

We claim:

1. A communications channel detector for determining the availability of a desired type of communications channel in a communication system having at least one communications channel, the communications channels including data streams comprising a plurality of data symbols, the channel detector comprising:

a phase identifier configured to provide a plurality 'n' of phase measurements for each of a plurality of consecutive ones of the data symbols comprising one of the communications channels, the n phase measurements for any one of the data symbols respectively corresponding to n timing offsets from a centre of the data symbol;

a phase comparator coupled to the phase identifier and configured to determine differences between the phase measurements for consecutive data symbols, each of the differences corresponding to one of the n timing offsets and determined between phase measurements corresponding to the one of the n timing offsets, to provide a plurality of phase differences for each timing offset; and a phase correlator coupled to the phase comparator and configured to determine whether or not the plurality of phase differences for at least one of the timing offsets exhibit a predetermined phase difference profile;

wherein the phase identifier is configured to measure the phase of each data symbol at a number 'm' of the n timing offsets, and to estimate the phase of each data symbol at n-m of the n timing offsets, to thereby provide m measured phase measurements and n-m estimated phase measurements as the n phase measurements wherein 'm' and 'n' are integers.

2. The channel detector according to claim 1, wherein the phase identifier is configured to estimate one or more of the n-m estimated phase measurements using the m measured phase measurements and an interpolation algorithm.

3. The channel detector according to claim 1, wherein the phase identifier is configured to estimate one or more of the n-m estimated phase measurements using the m measured phase measurements and an extrapolation algorithm.

4. A communications channel detector for determining the availability of a desired type of communications channel in a communication system having at least one communications channel, the communications channels including data streams comprising a plurality of data symbols, the channel detector comprising:

a phase identifier configured to provide a plurality 'n' of phase measurements for each of a plurality of consecutive ones of the data symbols comprising one of the communications channels, the n phase measurements for any one of the data symbols respectively corresponding to n timing offsets from a centre of the data symbol:

a phase comparator coupled to the phase identifier and configured to determine the differences between the phase measurements for consecutive data symbols, each of the differences corresponding to one of the n timing offsets and determined between phase measurements corresponding to the one of the n timing offsets, to provide a plurality of phase differences for each timing offset; and a phase correlator coupled to the phase comparator and configured to determine whether or not the plurality of phase differences for at least one of the timing offsets exhibit a predetermined phase difference profile;

wherein:

the predetermined phase difference profile comprises a histogram of expected phase differences for the desired type of communications channel;

the phase comparator is configured to form a histogram of the plurality of phase differences for each timing offset, to provide n histograms; and the phase correlator is configured to correlate each of the n histograms with the predetermined histogram;

wherein the phase correlator is configured to correlate the n formed histograms by analyzing each of the n histograms with a sliding window function;

wherein the phase correlator is further configured to calculate a metric for each of the n histograms using the sliding window function and to correlate each of the n histograms by comparing its corresponding metric with a threshold;

wherein the metric for each of the n histograms is calculated by computing an inner product of the predetermined phase difference profile and the histogram for each of a plurality of relative positions of the predetermined phase difference profile and the histogram, dividing each inner product by the number of phase differences used to form the histogram, and selecting a maximum of the resultant divided inner products as the metric for the histogram wherein 'm' and 'n' are integers.

5. The channel detector according to claim 1, further comprising a synchronization signal detector coupled to the phase correlator and configured to detect a synchronization signal on the selected communications channel when the phase correlator determines that the plurality of phase differences for at least one of the timing offsets exhibit the predetermined phase difference profile.

6. The channel detector according to claim 1, wherein the desired type of communications channel is a Gaussian Minimum Shift Keying (GMSK) communications channel.

7. The channel detector according to claim 1, further comprising a memory configured to store a channel list, the channel list including each of the at least one communications channel.

8. The channel detector according to claim 1, wherein $n \geq 8$.

9. The channel detector according to claim 1, wherein $n \leq 16$.

10. The channel detector according to claim 1, implemented in a wireless communication device.

11. The channel detector according to claim 9, wherein the wireless communication device is a device selected from the group consisting of a mobile communication device, a mobile telephone, a wireless modem, a pager, and a personal digital assistant (PDA).

12. In a communication system having at least one communications channel, each communications channel including data streams comprising a plurality of data symbols defining symbol periods, a method for determining the availability of a desired type of communications channel, comprising the steps of:

for each of the at least one communications channel,
obtaining a plurality 'n' of phase measurements for each of a plurality of consecutive ones of the data symbols comprising the communications channel;
for each pair of consecutive data symbols of the plurality of consecutive data symbols, determining n phase differences between ones of the obtained phase measurements separated in time by a symbol period, to provide n sets of phase differences between phase measurements for consecutive symbols; and
determining whether or not at least one of the n sets of phase differences exhibits a predetermined phase difference profile;

wherein the n phase measurements, the n phase differences and the n sets of phase differences respectively correspond to n timing offsets from a centre of each of the data symbols wherein 'm' and 'n' are integers.

13. The method according to claim 12, wherein:
the predetermined phase difference profile comprises a histogram of expected phase differences for the desired type of communications channel;
the step of determining n phase differences comprises forming a histogram of the phase differences of each of the n sets of phase differences, to provide n histograms; and
the step of determining whether or not at least one of the n sets of phase differences exhibits a predetermined phase difference profile comprises correlating each of the n histograms with the predetermined histogram.

14. The method according to claim 12, wherein the step of obtaining a plurality of phase measurements comprises the step of measuring the phase of each data symbol at each of the n timing offsets.

15. The method according to claim 12, wherein the step of obtaining a plurality of phase measurements comprises the steps of:
measuring the phase of each data symbol at each of m of the n timing offsets; and
estimating the phase of each data symbol at each of the remaining n-m of the n timing offsets.

16. The method according to claim 13, wherein the step of correlating comprises generating a metric by analyzing the n formed histograms with a sliding window function.

17. The method according to claim 16, wherein the step of determining whether or not at least one of the n sets of phase differences exhibits a predetermined phase difference profile comprises comparing the metric with a threshold.

18. The method according to claim 17, wherein the step of generating a metric comprises the steps of generating n metrics by analyzing each of the n histograms with the sliding window function and selecting a highest of the n metrics to be used in the step of comparing.

19. The method according to claim 12, wherein the data symbols carried on the desired type of communications channel are modulated in accordance with a Gaussian Minimum Shift Keying (GMSK) modulation scheme.

20. The method according to claim 12, further comprising the step of detecting a synchronization signal on the communications channel when it is determined that at least one of the n sets of phase differences exhibits the predetermined phase difference profile.

21. A wireless communication device comprising:
a transceiver configured to transmit and receive signals over a desired type of communications channel; and
a digital signal processor (DSP) operatively connected to the transceiver, the DSP comprising computer software code for determining the availability of the desired type of communications channel in a communication system having at least one communications channel, the communications channels including data streams comprising a plurality of data symbols, by performing the functions of:
for each of the at least one communications channels,
obtaining a plurality 'n' of phase measurements for each of a plurality of consecutive ones of the data symbols comprising the communications channel;
for each pair of consecutive data symbols of the plurality of consecutive data symbols, determining n phase differences between ones of the obtained phase measurements separated in time by a symbol period, to provide n sets of phase differences between phase measurements for consecutive symbols; and
determining whether or not at lease one of the n sets of phase differences exhibits a predetermined phase difference profile;
wherein the n phase measurements, the n phase differences and the n sets of phase differences respectively correspond to n timing offsets from a centre of each of the data symbols wherein 'm' and 'n' are integers.

22. The wireless communication device according to claim 21, wherein the device is selected from the group consisting of a mobile communication device, a mobile telephone, a wireless modem, a pager, and a personal digital assistant (PDA).

23. A computer-readable medium carrying processing instructions for configuring a computational device with a method for determining the availability of a desired type of communications channel in a communication system having at least one communications channel, the communications channels including data streams comprising a plurality of data symbols, the method comprising the steps of:
for each of the at least one communications channel,
obtaining a plurality 'n' of phase measurements for each of a plurality of consecutive ones of the data symbols comprising the communications channel;
for each pair of consecutive data symbols of the plurality of consecutive data symbols, determining n phase differences between ones of the obtained phase measurements separated in time by a symbol period, to provide n sets of phase differences between phase measurements for consecutive symbols; and
determining whether or not at lease one of the n sets of phase differences exhibits a predetermined phase difference profile;
wherein the n phase measurements, the n phase differences and the n sets of phase differences respectively correspond to n timing offsets from a centre of each of the data symbols wherein 'm' and 'n' are integers.

24. The channel detector according to claim 1, wherein:
the predetermined phase difference profile comprises a histogram of expected phase differences for the desired type of communications channel;
the phase comparator is configured to form a histogram of the plurality of phase differences for each timing offset, to provide n histograms; and
the phase correlator is configured to correlate each of the n histograms with the predetermined histogram.

25. The channel detector according to claim 24, wherein the phase correlator is configured to correlate the n formed histograms by analyzing each of the n histograms with a sliding window function.

26. The channel detector according to claim 25, wherein the phase correlator is further configured to calculate a metric for each of the n histograms using the sliding window function and to correlate each of the n histograms by comparing its corresponding metric with a threshold.

27. A communications channel detector for determining the availability of a desired type of communications channel in a communication system having at least one communications channel, the communications channels including data streams comprising a plurality of data symbols, the channel detector comprising:
a phase identifier configured to provide a plurality 'n' of phase measurements for each of a plurality of consecutive ones of the data symbols comprising one of the communications channels, the n phase measurements for any one of the data symbols respectively corresponding to n timing offsets from a centre of the data symbol;
a phase comparator coupled to the phase identifier and configured to determine the differences between the phase measurements for consecutive data symbols, each of the differences corresponding to one of the n timing offsets and determined between phase measurements corresponding to the one of the n timing offsets, to provide a plurality of phase differences for each timing offset; and
a phase correlator coupled to the phase comparator and configured to determine whether or not the plurality of phase differences for at least one of the timing offsets exhibit a predetermined phase difference profile;
wherein:
the predetermined phase difference profile comprises a histogram of expected phase differences for the desired type of communications channel;
the phase comparator is configured to form a histogram of the plurality of phase differences for each timing offset, to provide n histograms; and
the phase correlator is further configured to calculate a metric for each of the n histograms by computing the inner product of the predetermined phase difference profile and the histogram for each of a plurality of relative positions of the predetermined phase difference profile and the histogram, dividing each inner product by the number of phase differences used to form the histogram, and selecting the maximum of the resultant divided inner products as the metric for the histogram; and the phase correlator is further configured to correlate each of the n histograms by comparing its corresponding metric with a threshold wherein 'm' and 'n' are integers.

28. The channel detector according to claim 27, further comprising a synchronization signal detector coupled to the phase correlator and configured to detect a synchronization signal on the selected communications channel when the phase correlator determines that the plurality of phase differences for at least one of the timing offsets exhibit the predetermined phase difference profile.

29. The channel detector according to claim 27, wherein the desired type of communications channel is a Gaussian Minimum Shift Keying (GMSK) communications channel.

30. The channel detector according to claim 27, further comprising a memory configured to store a channel list, the channel list including each of the at least one communications channel.

31. The channel detector according to claim 27, wherein $n \geq 8$.

32. The channel detector according to claim 27, wherein $n \leq 16$.

33. The channel detector according to claim 27, implemented in a wireless communication device.

34. The channel detector according to claim 33, wherein the wireless communication device is a device selected from the group consisting of a mobile communication device, a mobile telephone, a wireless modem, a pager, and a personal digital assistant (PDA).

35. In a communication system having at least one communications channel, each communications channel including data streams comprising a plurality of data symbols defining symbol periods, a method for determining the availability of a desired type of communications channel, comprising the steps of:

for each of the at least one communications channel,
obtaining a plurality 'n' of phase measurements for each of a plurality of consecutive ones of the data symbols comprising the communications channel;
for each pair of consecutive data symbols of the plurality of consecutive data symbols, determining n phase differences between ones of the obtained phase measurements separated in time by a symbol period, to provide n sets of phase differences between phase measurements for consecutive symbols; and
determining whether or not at least one of the n sets of phase differences exhibits a predetermined phase difference profile;

wherein the step of obtaining a plurality of phase measurements comprises the steps of:

measuring the phase of each data symbol at each of m of the n timing offsets; and estimating the phase of each data symbol at each of the remaining n-m of the n timing offsets wherein 'm' and 'n' are integers.

36. The method of claim 35, wherein:

the predetermined phase difference profile comprises a histogram of expected phase differences for the desired type of communications channel;

the step of determining n phase differences comprises forming a histogram of the phase differences of each of the n sets of phase differences, to provide n histograms; and the step of determining whether or not at least one of the n sets of phase differences exhibits a predetermined phase difference profile comprises correlating each of the n histograms with the predetermined histogram.

37. The method according to claim 36, wherein the step of correlating comprises generating a metric by analyzing the n formed histograms with a sliding window function.

38. The method according to claim 37, wherein the step of determining whether or not at least one of the n sets of phase differences exhibits a predetermined phase difference profile comprises comparing the metric with a threshold.

39. The method according to claim 38, wherein the step of generating a metric comprises the steps of generating n metrics by analyzing each of the n histograms with the sliding window function and selecting a highest of the n metrics to be used in the step of comparing.

40. The method according to claim 35, wherein the data symbols carried on the desired type of communications channel are modulated in accordance with a Gaussian Minimum Shift Keying (GMSK) modulation scheme.

41. The method according to claim 35, further comprising the step of detecting a synchronization signal on the communications channel when it is determined that at least one of the n sets of phase differences exhibits the predetermined phase difference profile.

* * * * *

UNITED STATES PATENT AND TRADEMARK OFFICE
CERTIFICATE OF CORRECTION

PATENT NO. : 6,999,548 B2
APPLICATION NO. : 09/992814
DATED : February 14, 2006
INVENTOR(S) : Simmons

It is certified that error appears in the above-identified patent and that said Letters Patent is hereby corrected as shown below:

Column 14, line 51, replace "then sets" with -- the n sets --

Column 16, line 5, replace "at lease" with -- at least --

Signed and Sealed this

Nineteenth Day of December, 2006

JON W. DUDAS
*Director of the United States Patent and Trademark Office*